United States Patent [19]

Martin

[11] Patent Number: 4,942,144

[45] Date of Patent: Jul. 17, 1990

[54] INFRARED TRANSMITTING GLASSES WITH HIGH GLASS TRANSITION TEMPERATURES

[75] Inventor: Steve W. Martin, Ames, Iowa

[73] Assignee: Iowa State University Research Foundation, Inc., Ames, Iowa

[21] Appl. No.: 300,580

[22] Filed: Jan. 23, 1989

[51] Int. Cl.$^5$ .............................................. C03C 3/32
[52] U.S. Cl. ........................................ 501/40; 501/904
[58] Field of Search ................................. 501/40, 904

[56] References Cited

U.S. PATENT DOCUMENTS

| | | | |
|---|---|---|---|
| 2,883,291 | 4/1959 | Fraser | 106/47 |
| 3,188,216 | 6/1965 | Burton et al. | 106/47 |
| 3,841,739 | 10/1975 | Asahara et al. | 350/320 |
| 4,492,763 | 1/1985 | Trotta et al. | 501/40 |
| 4,557,914 | 12/1985 | Modone | 423/303 |
| 4,612,294 | 9/1986 | Katsuyama et al. | 501/40 |

FOREIGN PATENT DOCUMENTS 60-226427 11/1985 Japan .
806837 12/1958 United Kingdom .

OTHER PUBLICATIONS

Hilton, *Nonoxide Chalcogenide Glasses as Infrared Optic Materials*, Applied Optics, vol. 5, No. 12, Dec. 1966.

*Primary Examiner*—Mark L. Bell
*Assistant Examiner*—Deborah Jones
*Attorney, Agent, or Firm*—Zarley, McKee, Thomte, Voorhees & Sease

[57] ABSTRACT

A chalcogenide glass capable of infrared transmission which is either sulfur, selenium or tellurium based and consists of compositions of the formula $MX + M_2'X_3 + SiX_2$, wherein M is one of the metals calcium, strontium, barium, zinc and lead, and M' is either aluminum or gallium and X is either sulfur, selenium or tellurium. Aluminum or gallium chalcogenide acts to increase the covalent bonding network structure of the glass with the result being that excellent high temperature 8–14 micron IR transmitting glasses with transition temperatures above 500° C. are prepared.

7 Claims, 1 Drawing Sheet

INFRARED TRANSMITTING GLASSES WITH HIGH GLASS TRANSITION TEMPERATURES

BACKGROUND OF THE INVENTION

This invention relates to glasses, more particularly glasses which will transmit infrared radiation and possessing a high (>500° C.) glass transition temperature.

Commercially used glasses for infrared transmission capability are known to have low glass transition temperatures. Most of the known infrared transmission glasses are chalcogenide-based glasses due to their established infrared transparency and their inherent ease of fabrication. However, glass transition temperatures of these are so low as to make them uncompetitive with polycrystalline materials. For example, there are no known chalcogenide glasses which have glass transition temperatures ($T_g$) higher than 500° C.

Having high glass transition temperatures is desirable for a glass because it means increased use flexibility for the glass, generally improved durability and potential for a much more widely acceptable high performance infrared transmitting glass.

Accordingly, the primary objective of the present invention is to prepare a higher melting, higher $T_g$, and longer wavelength (>10 micrometer) infrared transmitting chalcogenide glass.

SUMMARY OF THE INVENTION

Figure 1:
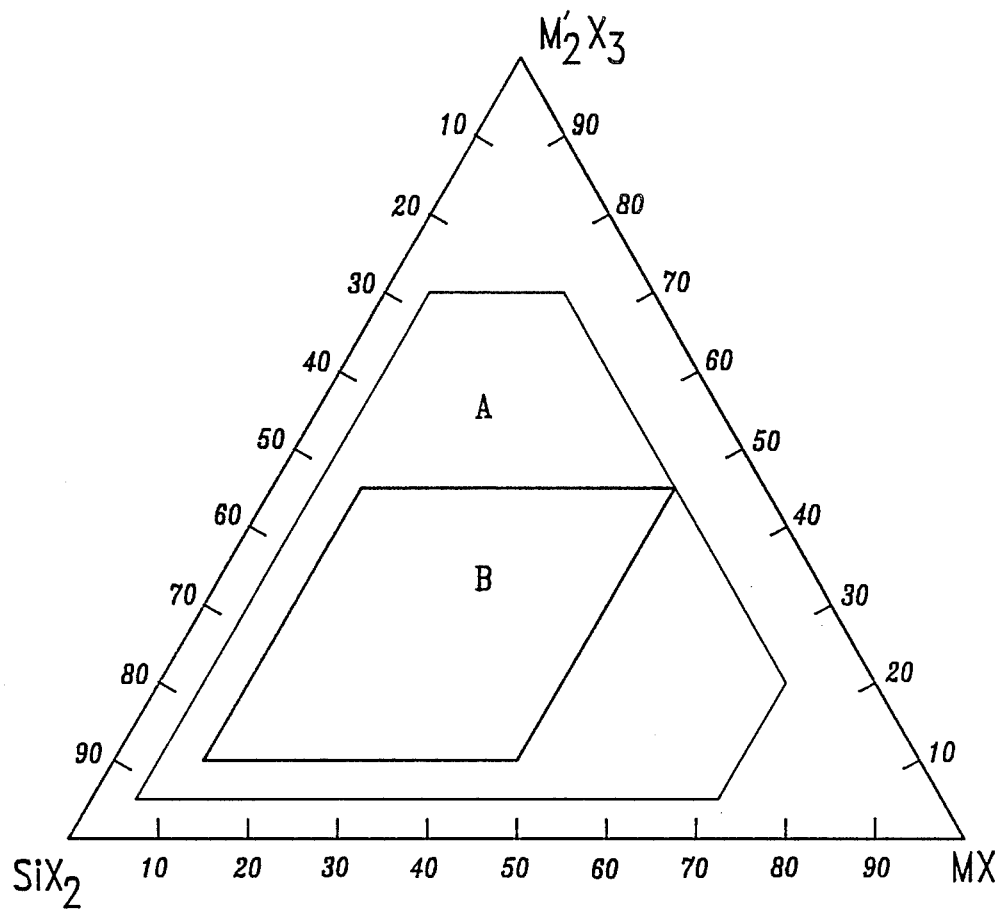
FIG. 1 is a schematic showing the range of compositions for glasses of this invention.

Chalcogenide glasses capable of infrared transmission and having high $T_g$, i.e. above 500° C. The glasses are sulfur, selenium or tellurium based and contain as intermetallics to limit chalcogen-to-chalcogen bonding, aluminum and gallium sulfide, selenide or telluride.

DETAILED DESCRIPTION OF THE INVENTION

There is much literature on low-melting, low-$T_g$ strong glass forming chalcogenides. See for example A. R. Hilton, *Applied Optics* 5 (12) (1966) 1877. However, the compositions of these are often complex and very little is known about their atomic structures. Moreover, for all of the reasons earlier stated, these low-melting, low-$T_g$ chalcogenides, while they are capable of infrared transmission, have limited usefulness because of their lack of durability, their low melting point, and their low $T_g$. In accordance with this invention, the applicant has discovered that chalcogenide glasses capable of infrared transmission and having high melting points, high $T_g$'s and therefore widely available for use can be made. In particular, while the glasses of the present invention do not approach a $T_g$ of pure silicon dioxide, $T_g$'s can be obtained within the range of 500° C. to 800° C., which is considerably higher than thought possible for infrared transmitting chalcogenide glasses.

The chalcogenide glasses of the present invention comprise a glass mixture of the formula:

$$MX + M_2'X_3 + SiX_2$$

In the above general formula for the glasses of the present invention, "M" represents a metal selected from the group of calcium, strontium, barium, zinc and lead. "M'" that is the metal used in the network bridging structure represents aluminum or gallium. "X" represents sulfur, selenium or tellurium.

The molar percent of "MX" is within the range of from about 5 mole percent to about $M_2'{}_{70}$ mole percent; likewise, the mole percent of $M_2'X_3$ is within the range from about 5 mole percent to about 70 mole percent. The balance is $SiX_2$, and this generally is within the range of from about 10 mole percent to about 90 mole percent. Preferably, both the MX and the $M_2'{}_3$ are within the range of from about 10 mole percent to about 45 mole percent, and the $SiX_2$ is within the range of from about 10 mole percent to about 80 mole percent.

FIG. 1 shows the compositional limits of the glasses so described. The composition region marked A on the figure bounded by a thin border delineates the composition region where glasses possessing the properties described therein can be prepared. The composition region marked B on the figure bounded by a heavy border, delineates the preferred composition region.

While the applicant does not wish to be bound by any theory, it is believed that in order to maintain high glass transition temperatures, a 3-dimensional, covalent bonding network must be maintained without significant amounts of weak chalcogen-to-chalcogen bonding. It is believed that the chalcogen-to-chalcogen bonding is what currently limits the $T_g$'s of the presently known chalcognide glasses.

Limited chalcogen-to-chalcogen bonding by use of cations with electronegatives such that the glass former cation to chalcogen bonding is preferred over the chalcogen-to-chalcogen bonding results in higher $T_g$'s. In particular, in this invention the intermetallics used as glass formers are aluminum and gallium. The aluminum- and gallium-based chalcogenides can be thought to be "chalcogenide-crown" systems which function as bridging agents between the chain structures of the pure silicon dichalcogenides. In this way, the $Al_2X_3$ or the $Ga_2X_3$ act as cross-linking agents in a manner similar to that seen in oxide silicates. These compositions exhibit crosslinking structures between long chain $SiX_2$ units to give rise to high-$T_g$ IR transparent glasses.

In particular, glasses of the present invention have a $T_g$ of 500° C. or above, and generally within the range of 500° C. to about 800° C. Glasses have IR transmission capability within the range of from about 8 to 14 microns and typically at about 10 microns. They have a Knoop hardness of about 350 KHN, a coefficient of linear expansion of from ~1 to ~$5 \times 10^{-6}$/°C. and a Young's Modulus of ~$6 \times 10^6$ PSI (~41,000 MPa).

The following examples are offered to further illustrate but not limit the process and composition of the present invention.

A state-of-the-art preparation facility was developed in order to prepare the chemically reactive glasses of this invention. The glove box is equipped with a high temperature furnace which is typically operated at 1500° C. and has the capability of reaching 2000° C. with little difficulty. Carbon crucibles were used to contain the reactive chalcogenide melts. Charges of about 5 grams were weighed out using the analytical balance, and transferred to the appropriate reaction vessel, and heated to 1300° C. and held for one hour. Quenching was achieved by allowing the crucible and charge to cool freely once removed from the furnace.

Various glass batch charges of approximately 5 grams are weighed out using an analytical balance (to ±0.001 gram) from reagent grade starting materials (99.99% purity) inside an oxygen- and H20-free glove box (<10ppm $O_2$ or $H_2O$). The powders are ground in a mortar and pestle and thoroughly mixed. The powder is then transferred to a vitreous carbon crucible (~30 mL) and covered with a vitreous carbon lid. The crucible and cover are then loaded into a Molybdenum wire wound furnace in the glove-box and heated slowly (~1 hour) up to approximately 1300° C. After holding at this temperature for approximately one hour, the crucible and liquid are removed from the furnace and allowed to slow cool to room temperature. No crystallization of the melt on cooling is observed and verified using x-ray diffraction analysis. Weight measurements before and after melting are used to confirm no composition changes during melting.

The two critical properties of the high-$T_g$ chalcogenide glasses that are of interest here are the glass transition temperature, as indicative of the upper use temperature, and the infrared transmission window, or range.

A glass such as 0.5 $BaS:Al_2S_3$ and 0.5 $SiS_2$ exhibits a glass transition temperature of 580° C. This value is more than 80° C. higher than any previously reported chalcogenide glass.

The second critical parameter for the application of these materials as new IR windows is their long wavelength cutoff in the far infrared. As typical of the glasses, the glass 0.15 $BaS:Al_2S_3 + 0.85$ $SiS_2$ exhibits IR transmission down to 10 microns (1 micron = $1 \times 10^{-6}$m).

All the above descriptions and examples have been given with reference to the use of silicon based compositions, i.e. $SiX_2$, it is possible that the silicon can be replaced with germanium (Ge), i.e. $GeX_2$.

What is claimed is:

1. A chalcogenide glass having a range of infrared transmission, consisting essentially of: a glass mixture of the formula: $MX + M_2'_3 + SiX_2$, wherein M is a metal selected from the group consisting of calcium, strontium, barium, zinc and lead, M' is a metal selected from the group consisting of aluminum and gallium and X is selected from the group consisting of sulfur, selenium and tellurium;

the mole percent of MX is within the range of from about 5% to about 70%, the mole percent of $M_2'X_3$ is within the range of from about 5% to about 70%, and the mole percent of $SiX_2$ is within the range of from about 10% to about 90%, and the glass has a $T_g$ of at least 500° C.

2. The composition of claim 1 wherein the amount of MX is from about 10 mole percent to about 45 mole percent.

3. The composition of claim 1 wherein the amount of $M_2'_3$ is from about 10 mole percent to about 45 mole percent.

4. The composition of claim 1 wherein the amount of $SiX_2$ is from about 10 mole percent to about 80 mole percent.

5. The composition of claim 1 wherein the $T_g$ is from about 500° C. to about 800° C.

6. The composition of claim 1 wherein the infrared transmission range is ~8 microns to ~14 microns.

7. The composition of claim 6 wherein the infrared transmission range is ~10 microns to ~14 microns.

* * * * *